(No Model.) 2 Sheets—Sheet 1.

J. D. BANDHOLZ.
BAKE OVEN.

No. 412,943. Patented Oct. 15, 1889.

Witnesses
Geo. W. Young
William Klug

Inventor
John D. Bandholz
By Stout & Underwood
Attorneys (No Model.) 2 Sheets—Sheet 2.

J. D. BANDHOLZ.
BAKE OVEN.

No. 412,943. Patented Oct. 15, 1889.

Witnesses
Geo. W. Young.
William Klug

Inventor
John D. Bandholz

UNITED STATES PATENT OFFICE.

JOHN D. BANDHOLZ, OF MILWAUKEE, WISCONSIN.

BAKE-OVEN.

SPECIFICATION forming part of Letters Patent No. 412,943, dated October 15, 1889.

Application filed January 26, 1889. Serial No. 297,710. (No model.)

*To all whom it may concern:*

Be it known that I, JOHN D. BANDHOLZ, of Milwaukee, in the county of Milwaukee, and in the State of Wisconsin, have invented certain new and useful Improvements in Bake-Ovens; and I do hereby declare that the following is a full, clear, and exact description thereof.

My invention relates to bake-ovens; and it consists in certain peculiarities of construction and arrangements of parts, as will be fully set forth hereinafter, and pointed out in the claims.

Figure 1:
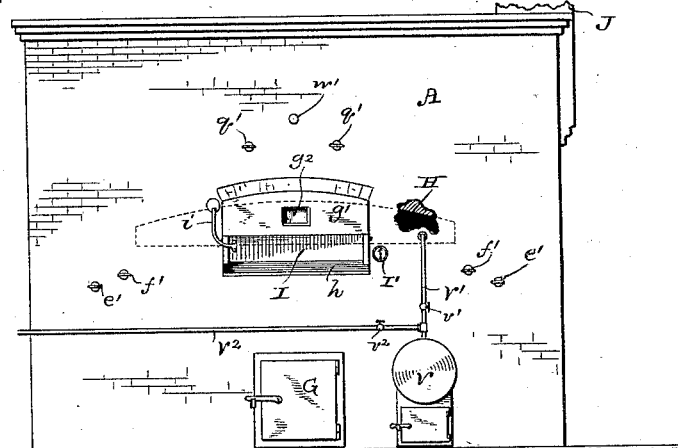
Figure 2:
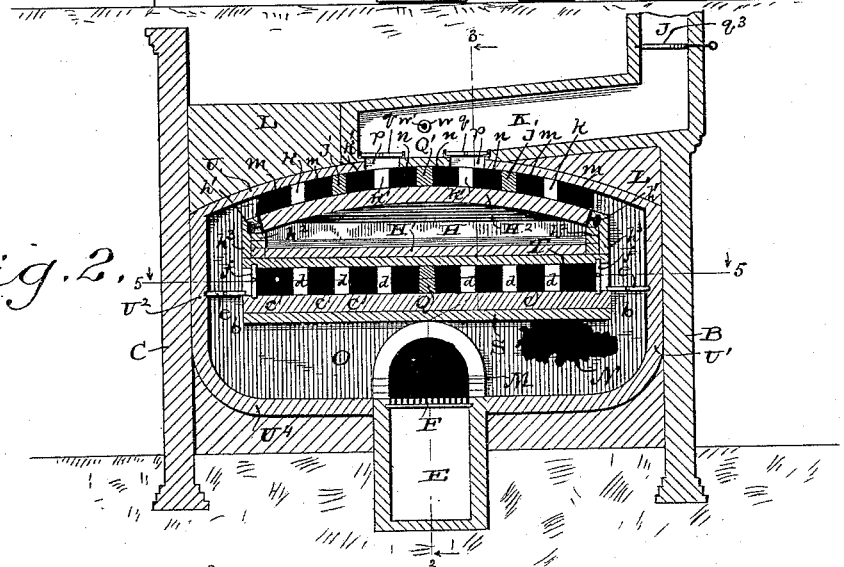
Figure 3:
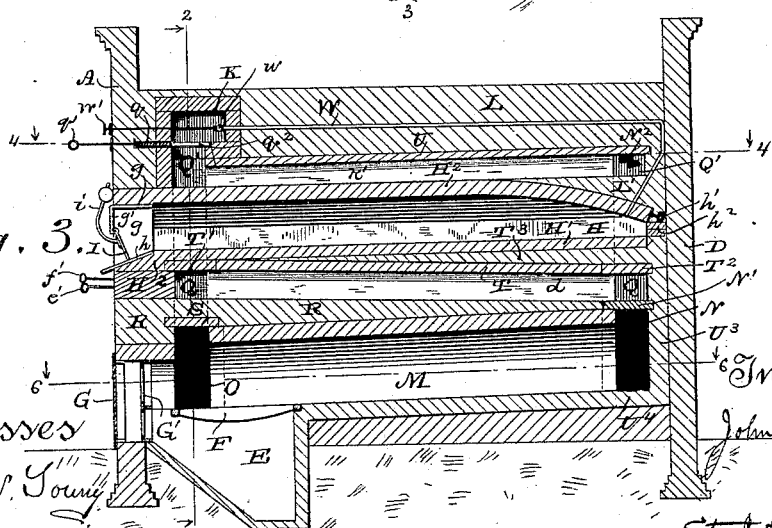
Figure 4:
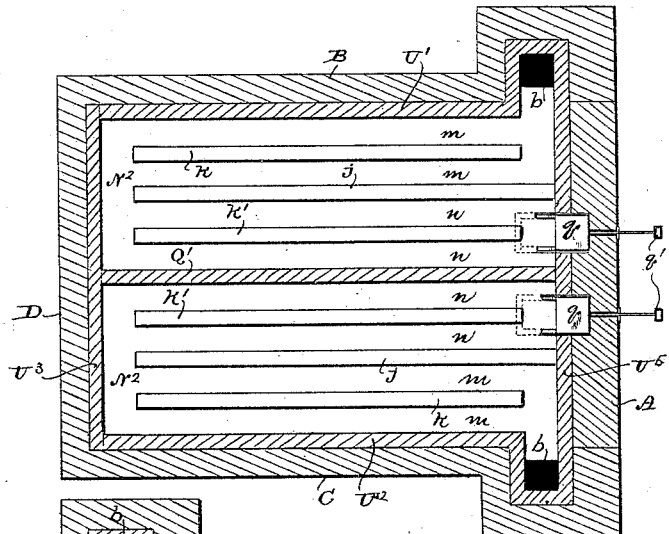
Figure 5:
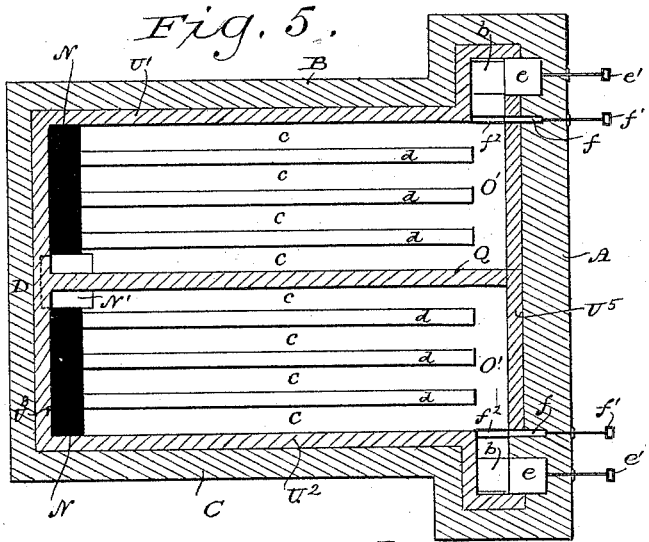
Figure 6:
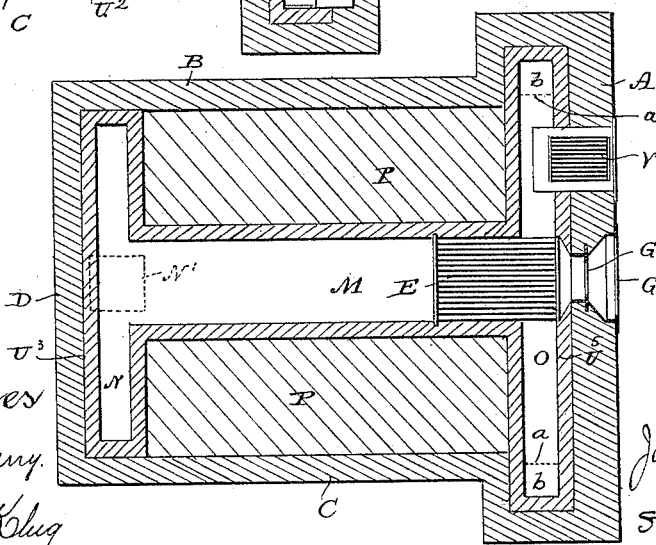

In the drawings, Figure 1 is a front elevation of my improved bake-oven, partially broken away. Fig. 2 is a vertical section on the line 2 2 of Fig. 3. Fig. 3 is a vertical section on the line 3 3 of Fig. 2. Fig. 4 is a horizontal section on the line 4 4 of Fig. 3. Fig. 5 is a horizontal section on the line 5 5 of Fig. 2. Fig. 6 is a horizontal section on the line 6 6 of Fig. 3.

A represents the front of my bake-oven, B C the side walls thereof, and D the rear wall, of suitable brick-work.

E is the ash-pit, F the grate or fire-bed, and G G' the doors thereof.

H is the bake-oven proper, and I the door thereof.

J is the chimney, and K the escape-flue for smoke and products of combustion leading thereto, in the upper part L of the structure.

M is a heat and smoke flue (the walls of which are built of fire-brick) leading at an upward incline from the lower front chamber O, above the the fire-bed, back to the lower rear chamber N. The remainder of the lower part of the structure on each side of the flue M (indicated by the letters P P) is built up with ordinary brick, as best shown in Fig. 6, which may be termed the "ground plan" of my structure. Above this ground plan, but beneath the oven, is the second story of my structure, (illustrated in Fig. 5,) consisting of a series of flues or channels separated from a like series by a central wall Q, of fire-brick, extending the entire length of the structure. The floor R of this story (which is the ceiling of the ground story) inclines upward from rear to front, as shown in Fig. 3, and is built of ordinary brick, the front lower chamber O being covered by plates of fire-brick S, which extend over the same between the dotted lines $a\ a$ in Fig. 6, leaving openings or vertical flues $b\ b$ at each end of said plates S in the front corners of the structure to admit heat to the story above. The described flues or channels, Fig. 5, are marked $c\ c\ c$, and they are separated from each other by fire-brick walls $d\ d\ d$, which extend only part of the length of the structure, extending back so far as the rear chamber N and forward so far as the rear line of the front lower chamber O, forming at the front two other chambers O' O', separated from each other by the central wall Q, and from the chamber O below by the floor of plates S, and communicating therewith by means of the described corner-flues $b\ b$, the admission of heat at the front, from said flues $b\ b$ to said chambers O' O', being governed by the horizontal dampers $e\ e$, which are arranged to entirely close the flues $b\ b$ when the damper-handles $e'\ e'$ are pushed in, there being other and vertically-arranged dampers $f\ f$, with handles $f'\ f'$, for a purpose hereinafter described, sliding in grooves $f^2\ f^2$, formed in the floor of said chambers O' O' and in the fire-brick ceiling T of this second story, said vertical dampers being nearer the center of the structure than said horizontal dampers, as shown in Figs. 2 and 5. The lower rear chamber N extends to the top of the described second story, only interrupted, at the center, (in line with the rear of the floor R and above the rear end of the flue M,) by the fire-brick deflecting-plate N', whose function is to divide the heat so that half shall pass into the series of flues on each side of the central wall Q of said second story. Above the inclined fire-brick ceiling T of the second story (which ceiling ends, at front and rear, with fire-brick plates T' T², above the chambers O' and N) there is built a layer of ordinary brick T³, increasing in thickness from front to rear, so that the surface shall be level, and on this level surface is built the floor H' of the bake-oven H, said floor being of burnt-clay plates, the front of the oven-floor tapering downward, as shown at H², and having an outward and downward projecting inclined iron plate $h$, and the entire oven-opening in the front wall A being lined with iron, as shown at $g\ g$, the top plate having a front vertical iron plate $g'$, covering about half of the oven-opening, and provided with a glass window $g^2$, so that the contents of the oven can be examined without opening the oven-door I, which is hung from said front plate $g'$, and kept normally closed, at an inward angle, against the lower inclined plate $h$, by a weighted arm $i$, and beside the door is a pyrometer I' to indicate the temperature of the oven. The roof $H^2$ of the oven is made of fire-brick and is arched from side to side and also curved downward at the rear, the side and rear edges of said roof being braced by sections of rail-irons $h'$ $h'$ $h'$, built into the brick-work and resting on the courses of fire-brick $h^2$ $h^2$ $h^2$, which form the sides and ends of the oven-walls, said courses being horizontal and supplemented by vertical courses $h^3$ $h^3$ of fire-brick at the sides, the vertical courses forming the inner walls of the before-described vertical corner flues $b$ $b$, which extend up above the line of the dampers $e$ $e$ to the upper story of the structure above the oven, as illustrated in Fig. 4, the roof $H^2$ of the oven forming the floor of said upper story, which, like the second story, is centrally divided by a fire-brick wall $Q'$ into two series of flues, but which upper story has no rear openings for heat. In place thereof the fire-brick walls dividing the flues of each series are thus arranged: Each half of said story has one wall $j$, extending from the front wall back to the rear chamber $N^2$ of said division, and on each side of this wall a wall $k$, (and $k'$,) which extends back to the same point, but extends forward only part of the way to the said front wall, so that the heat must first pass from the front corner flues $b$ $b$ into and through the flues $m$ $m$ to get to the rear chambers $N^2$ $N^2$, and thence forward again through the flues $n$ $n$ and openings $p$ $p$ into the escape-flue K, leading to the chimney J, said openings $p$ $p$ being controlled by dampers $q$ $q$, moving in suitable ways $q^2$ $q^2$, and whose handles $q'$ $q'$ extend through the front A of the structure, the chimney J being provided with a suitable damper $q^3$, as shown. The roof U of the upper story is arched to correspond with the curve of the floor thereof, (or roof of the oven,) and is built of fire-brick, above which the structure is built up of ordinary brick, as shown at L L, the space at the rear of said structure above the rear curved part of the oven-roof $H^2$ being similarly bricked in, as shown at L' in Fig. 3, and the fire-brick work of the described roof U is continued at the sides, rear, and bottom of the structure, as shown at $U'$ $U^2$ $U^3$ $U^4$, and at the front $U^5$, (forming an inside lining of the outer walls A B C D and bottom of the structure,) so that the oven and its flues are all incased in said fire-brick lining.

V represents a small steam-boiler, from which one pipe V' leads into the oven, having a suitable valve $v'$, and from below this valve a branch pipe $V^2$ (having also a suitable valve $v^2$) leads off to any suitable place—as, for instance, the dough mixing and raising room—where the steam may be utilized when not needed in the oven, and from the oven a pipe W leads to the escape-flue K, and is there provided with a valve $w$, having an operating rod or handle $w'$ projecting through the front A of the structure. The chimney must be high and have a good strong draft.

The operation of my bake-oven will be readily understood from the foregoing description of its construction and arrangement. Fire is started on the grate F—either wood or coal being used, as preferred—and the dampers arranged according to the needs of the case and the material to be baked. Suppose the baker desires to have the heat applied only above the oven. In this case the vertical dampers $f$ $f$ are closed and the dampers $e$ $e$ opened. The heat then will rise up through the front corner-flues and, as it cannot get past the dampers $f$ into the chambers O' O' of the second story, will pass up into the upper story through the flues $m$ $m$ to the rear upper chambers $N^2$ $N^2$ and back through the flues $n$ $n$, and so out through the openings $p$ $p$, flue K, and chimney J, heating the oven from above in its passage back and forth over the roof thereof through the said flues $m$ $m$ and $n$ $n$. If, instead, the baker desires heat below as well as above the oven, then the dampers $f$ are opened and the dampers $e$ closed. The heat then can only escape through the flue M into the lower rear chamber N and out under and on each side of the deflecting-plate N' and forward under the oven, through the flues $c$ $c$, to the front chambers O' O', and thence up through the corner-flues $b$ $b$ into the upper story, as before, and back and forth through the flues of said upper story above the oven to the chimney, as just described. The heat can be retained in the chambers and flues by closing the dampers $q$ $q$; but they must be opened during baking, more or less, according to the amount of draft required.

When moist heat is desired in the oven, steam is admitted by turning the valve $v'$ of the pipe V', leading from the boiler V, and steam or an excess of hot air may be released from the oven at any time by turning the valve $w$ at the end of the pipe W, and, as already described, steam, when not needed in the oven, may be utilized in the dough mixing and raising room by closing said valve $v'$ and opening the valve $v^2$ in the branch pipe $V^2$ leading to said room.

Having thus fully described my invention, what I claim as new, and desire to secure by Letters Patent, is—

1. In a bake-oven, the combination of a suitable structure with a fire-place, central flue extending therefrom, and communicating front and rear transverse heat-chambers on the lower story, front corner-flues leading from said front heat-chambers to the upper story of the structure, an intermediate and an upper story provided with series of longitudinal flues communicating with said heat-chambers on said lower story, dampers to control the flues at the front of the structure in the intermediate story, an escape-flue leading from the upper story to the chimney, dampers controlling the openings to said flue, and an oven interposed between the intermediate and upper stories, substantially as set forth.

2. In a bake-oven, the combination of a suitable structure with a fire-place, central flue extending therefrom, and communicating front and rear transverse heat-chambers on the lower story, front corner-flues leading from said front heat-chamber to the upper story of the structure, an intermediate and an upper story in communication with said front corner-flues, said intermediate story being provided with front and rear heat-chambers and communicating longitudinal flues centrally divided by a longitudinal wall, dampers controlling the passage of heat from the front corner-flues to the story above, and other dampers controlling the passage of heat from these points to the front heat-chambers of the intermediate story, the rear heat-chamber of this story being provided with a central deflecting-plate, but otherwise in communication with the rear heat-chamber below, an oven interposed between this story and the upper story, and an escape-flue leading to the chimney from said upper story, the latter being centrally divided by a longitudinal wall and having series of longitudinal flues on each side thereof arranged in pairs, all communicating at the rear, but each pair separated from the other at the front, and the inner pairs adjacent to the central longitudinal wall of said story having damper-controlled passages leading to said escape-flue, substantially as set forth.

3. In a bake-oven, the combination of the sides, top, bottom, and rear end thereof with a front casing having an upper vertical plate partly covering the front opening and a lower inclined plate, an inwardly-swinging door suspended from the said upper vertical plate, and a weighted arm attached to said door, whereby it will be held normally closed against said lower inclined plate at an angle to said upper vertical plate, substantially as set forth.

4. In a bake-oven, the combination of a suitable structure, fire-place, and flues and heat-passages, an oven, a steam-boiler with a pipe leading to said oven and extending through the front wall thereof and having a suitable valve outside of the oven, a branch pipe leading from said first-named pipe between said valve and said steam-boiler and having also a suitable valve, and an escape-pipe leading from the rear of said oven, above the same, to the smoke-escape flue and terminating in a valve, with an operating-rod projecting through the wall of the main structure, substantially as set forth.

In testimony that I claim the foregoing I have hereunto set my hand, at Milwaukee, in the county of Milwaukee and State of Wisconsin, in the presence of two witnesses.

JOHN D. BANDHOLZ.

Witnesses:
H. G. UNDERWOOD,
WILLIAM KLUG.